United States Patent
Schneider et al.

(10) Patent No.: US 10,693,787 B2
(45) Date of Patent: Jun. 23, 2020

(54) THROTTLING FOR BANDWIDTH IMBALANCED DATA TRANSFERS

(71) Applicant: INTEL CORPORATION, Santa Clara, CA (US)

(72) Inventors: Timo Schneider, Zurich (CH); Keith D. Underwood, Powell, TN (US); Mario Flajslik, Hopkinton, MA (US); Sayantan Sur, Portland, OR (US); James Dinan, Hudson, MA (US)

(73) Assignee: Intel Corporation, Santa Clara, CA (US)

(*) Notice: Subject to any disclaimer, the term of this patent is extended or adjusted under 35 U.S.C. 154(b) by 48 days.

(21) Appl. No.: 15/686,264

(22) Filed: Aug. 25, 2017

(65) Prior Publication Data

US 2019/0068501 A1 Feb. 28, 2019

(51) Int. Cl.
*H04L 12/801* (2013.01)
*G06F 9/48* (2006.01)
*H04L 12/935* (2013.01)
*H04L 12/803* (2013.01)
*H04L 29/08* (2006.01)

(52) U.S. Cl.
CPC ............ *H04L 47/10* (2013.01); *G06F 9/4881* (2013.01); *H04L 47/125* (2013.01); *H04L 49/3072* (2013.01); *H04L 67/10* (2013.01)

(58) Field of Classification Search
CPC ........ H04L 47/10; H04L 67/10; G06F 9/4881
See application file for complete search history.

(56) References Cited

U.S. PATENT DOCUMENTS

| | | | | |
|---|---|---|---|---|
| 6,980,567 | B1* | 12/2005 | Markevitch | H04L 12/4633 370/389 |
| 8,509,069 | B1* | 8/2013 | Poon | H04L 49/254 370/230 |
| 8,676,851 | B1* | 3/2014 | Nesbit | G06F 17/30227 707/791 |
| 8,843,714 | B1* | 9/2014 | Smirnov | G06F 11/3485 711/100 |
| 9,063,841 | B1* | 6/2015 | Valency | H04L 49/9042 |
| 2003/0031208 | A1* | 2/2003 | Anehem | H04W 28/14 370/474 |

(Continued)

OTHER PUBLICATIONS

Schneider et al. Fast Networks and Slow Memories: A Mechanism for Mitigating Bandwidth Mismatches, Aug. 28-30, 2017, IEEE (Year: 2017).*

(Continued)

*Primary Examiner* — Tejis Daya
(74) *Attorney, Agent, or Firm* — Finch & Maloney PLLC

(57) ABSTRACT

Techniques are disclosed to throttle bandwidth imbalanced data transfers. In some examples, an example computer-implemented method may include splitting a payload of a data transfer operation over a network fabric into multiple chunk get operations, starting the execution of a threshold number of the chunk get operations, and scheduling the remaining chunk get operations for subsequent execution. The method may also include executing a scheduled chunk get operation in response determining a completion of an executing chunk get operation. In some embodiments, the chunk get operations may be implemented as triggered operations.

20 Claims, 6 Drawing Sheets

(56) References Cited

U.S. PATENT DOCUMENTS

| | | | |
|---|---|---|---|
| 2003/0120879 A1* | 6/2003 | Chen | G06F 5/10 |
| | | | 711/154 |
| 2006/0039379 A1* | 2/2006 | Abe | H04L 49/90 |
| | | | 370/394 |
| 2007/0025289 A1* | 2/2007 | Nandagopalan | H04W 28/20 |
| | | | 370/329 |
| 2007/0116026 A1* | 5/2007 | Huang | H04L 45/00 |
| | | | 370/412 |
| 2008/0313237 A1* | 12/2008 | Asoline | H04L 69/324 |
| 2009/0113145 A1* | 4/2009 | Slater | G06F 11/1451 |
| | | | 711/154 |
| 2014/0177445 A1* | 6/2014 | Kurian | H04L 1/1864 |
| | | | 370/236 |
| 2014/0219276 A1* | 8/2014 | Jokinen | H04L 47/62 |
| | | | 370/392 |
| 2014/0241258 A1* | 8/2014 | Zack | H04W 28/18 |
| | | | 370/329 |
| 2015/0200873 A1* | 7/2015 | Wittenschlaeger | H04L 49/25 |
| | | | 398/48 |
| 2017/0279723 A1* | 9/2017 | Vedam | H04L 47/125 |

OTHER PUBLICATIONS

Barrett, B., et al., "Using triggered operations to offload rendezvous messages", Springer-Verlag, 2011, pp. 120-129.

Brightwell, R. and K. Underwood, " Evaluation of an eager protocol optimization for MPI", Sandia National Laboratories, 2003, 8 pages.

Graham, R.L., et al., "Open mpi: A high performance, flexible implementation of mpi point-to-point communications", Parallel Processing Letters, 2007, vol. 17, 10 pages.

Gropp, W., et al., "A high-performance, portable implementation of the MPI message passing interface standard", Parallel computing, 1996, vol. 22, pp. 789-828.

Gusat, M., et al., "Congestion control in infiniband networks", IEEE, 2005, 2 pages.

Hassani, A., et al., "Design, implementation, and performance evaluation of MPI 3.0 on portals 4.0", Proceedings of the 20th European MPI Users' Group Meeting, AMC, 2013, 6 pages.

Luo, M., et al., "Congestion avoidance on manycore high performance computing systems", Proceedings of the 26th ACM international conference on supercomputing, ACM, 2012, 12 pages.

Pfister, Gregory, "An introduction to the infiniband architecture", High Performance Mass Storage and Parallel I/O, 2001, vol. 42, pp. 617-632.

Rashti, M.J., et al., "Improving Communication Progress and Overlap in MPI Rendezvous Protocol over RDMA-enabled Interconnects", 2008, HPCS, 22nd International Symposium on. IEEE, 7 pages.

Raffenetti, K., et al., "Toward Implementing Robust Support for Portals 4 Networks in MPICH", Cluster, Cloud and Grid Computing (CCGrid), 2015, 15th IEEE/ACM International Symposium on. IEEE, 5 pages.

Schneider, T., et al., "Protocols for Fully Offloaded Collective Operations on Accelerated Network Adapters", Parallel Processing (ICPP), 2013, 42nd International Conference on., 10 pages.

* cited by examiner

THROTTLING FOR BANDWIDTH IMBALANCED DATA TRANSFERS

STATEMENT REGARDING FEDERALLY SPONSORED RESEARCH OR DEVELOPMENT

This invention was made with Government support under contract number H98230B-13-D-0124-0132 awarded by the Department of Defense. The Government has certain rights in this invention.

BACKGROUND

Network links have traditionally been the limiting factor of network transfers between nodes. This is primarily due to the performance of the network link being slower than the performance of the memory hierarchy within the nodes. Consequently, data communication protocols have been designed to inject data as fast as possible into the network in order to minimize latency and achieve high bandwidth. These communication protocols are suitable as long as the sink bandwidth of the memory hierarchy within the nodes is able to sustain the rate of egress from the network.

The advent of non-volatile memory (NVM) technologies introduces an interesting nuance to the node level memory hierarchy. NVM provides higher density, lower cost, and lower power consumption than conventional dynamic random-access memory (DRAM). Given these benefits, NVM is being deployed in a variety of environments, including high performance datacenter systems, data-intensive scientific and data-analysis systems, and high performance computing (HPC) systems, to name a few. In many of these systems, high performance network fabrics have reached 100 Gb/s speeds, which results in a source/sink mismatch in that the high performance network fabric bandwidth is significantly higher than the write bandwidth of the NVM. In these environments, network transfers using conventional communication protocols are likely to overwhelm the receiver due to the source/sink mismatch.

BRIEF DESCRIPTION OF THE DRAWINGS

The accompanying drawings are not intended to be drawn to scale. In the drawings, each identical or nearly identical component that is illustrated in the various figures is represented by a like numeral, as will be appreciated when read in context.

Figure 1:
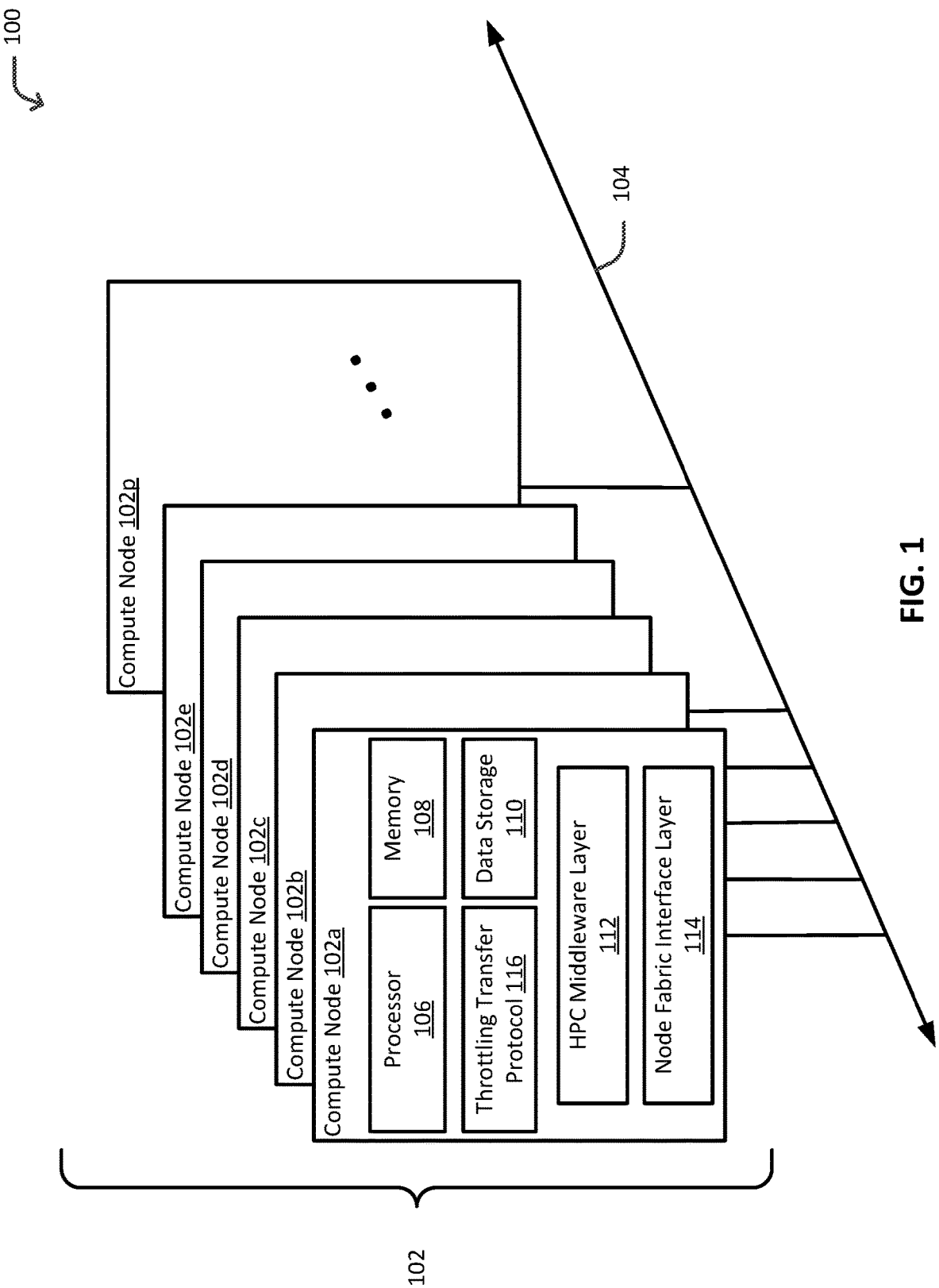
FIG. 1 illustrates an example operating environment in which some embodiments of a throttling transfer protocol may operate, in accordance with at least some embodiments described herein.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques to throttle bandwidth imbalanced data transfers over network fabrics are disclosed. The throttling is achieved by splitting (breaking up) a single transfer of a large amount of data (e.g., a large transfer of a "payload") into multiple chunks of data, and transferring each chunk of data individually. The payload excludes the control information (e.g., headers, addressing information, sequencing information, error detection codes, etc.) included in a message to facilitate the payload delivery. The transfer of each chunk of data may be scheduled such that a subsequent transfer of a chunk of data is started upon the completion of an execution of a previous transfer of a chunk of data. For example, a threshold number of chunk transfers may be initiated and become outstanding chunk transfers, and the remaining number of chunk transfers scheduled for execution. Upon the completion of an initiated chunk transfer, a scheduled chunk transfer may be initiated. The size of each chunk (chunk size) and/or the threshold number of chunk transfers permitted to be outstanding may be chosen (set) to avoid congesting the network fabric (e.g., overwhelming the network buffers) even in the presence of a bandwidth mismatch.

As previously noted, current communication protocols are not suited for environments where the limiting factor of network transfers are the network nodes (e.g., where network capabilities are significantly higher than the write bandwidth of the NVM). Large message transfers in these environments using current communication protocols will fill all available buffer (memory) space in the network nodes (e.g., network switches), and ultimately lead to network congestion. This is due to the data not being written into the NVM fast enough to keep up with the arrival of the data over the network. The congestion created by a small number of such bandwidth imbalanced large message transfers can negatively affect the entire network.

In a high performance computing (HPC) system, a large number (e.g., hundreds, or thousands to hundreds of thousands, or more) of processors, or compute nodes, are connected to each other over a high speed network fabric. Each compute node has associated resources, including local memory, which as noted above, is likely to be NVM. Multiple numbers of the compute nodes in an HPC system may be configured to work in parallel on a computing task for a parallel application designed to solve a complex task, such as a physics simulation, big data analysis, and machine learning applications, to name a few. For example, each of the multiple compute nodes may execute a thread or an instance of the parallel application, and coordinate execution of the threads for the computing task by passing large messages (e.g., messages containing very large amounts of data) over the high speed network fabric. However, in executing a thread, the compute node is likely to write the received data directly into its NVM as the size of the data makes it impractical to employ a cache. In an HPC system, or any system where the network fabric performance exceeds memory performance, the large message transfers can degrade the network fabric performance and, ultimately, impact the overall performance of the HPC system.

To this end, techniques are disclosed to throttle bandwidth imbalanced data transfers over network fabrics. The techniques may be implemented, for example, in an HPC system to achieve large message transfers (transfers of large payloads) between compute nodes of the HPC system without degrading the performance of a network fabric within the HPC system. The techniques provide a receiver-driven throttling transfer protocol for large message transfers between network nodes (e.g., a sender node and a receiver node) that transparently throttles bandwidth mismatched transfers. The protocol is receiver-driven in that the protocol provides for the use of remote memory get operations to transfer all or most of a single payload. Instead of using a single get operation to transfer the payload, the protocol provides for splitting (breaking up) the payload into multiple chunks, and transferring each chunk individually using a corresponding number of chunk get operations (e.g., one remote memory get operation to transfer each chunk of the payload). The protocol provides for the receiver node to split a single payload transfer operation into multiple chunk get operations, start execution of (execute) a threshold number of chunk get operations, schedule the remaining chunk get operations for subsequent execution, and specify the manner (e.g., condition or conditions) in which the scheduled chunk get operations are to be executed. For example, the receiver node can specify that one scheduled chunk get operation is to start executing upon the completion of a previous chunk get operation. Accordingly, the protocol allows the receiver node to schedule the transfer of each chunk of the payload in a manner as to avoid overwhelming available memory bandwidth of the receiver node and congesting the network fabric.

In some embodiments, the size of each chunk (chunk size) and a maximum number of chunk get operations outstanding (e.g., the threshold number of chunk get operations initially executed) may be chosen based on the write bandwidth of the NVM of the receiver node, the capabilities of the network fabric (e.g., network bandwidth, amount of buffering available in the network, round trip transmission times, and the like), or a combination of the write bandwidth of the NVM of the receiver node and the network fabric capabilities. For example, the values may be determined based on benchmark tests of the write bandwidth and/or the network fabric capabilities. Choosing the values in this manner may ensure that the network fabric is not flooded with chunk get operations that cannot complete due to insufficient write bandwidth or buffering space at the receiver node.

In some embodiments, the chunk get operations may be implemented using triggered operations (e.g., operations that are triggered based on a condition or conditions). In some embodiments, the triggered operations may be triggered off of a counter. For example, a triggered operation may start executing once the counter to which the triggered operation is attached reaches a specified threshold value.

In some embodiments, the protocol may be implemented as part of a high performance network communication layer interface within an HPC system. For example, in instances where the high performance communication layer interface supports a rendezvous protocol, the protocol may be implemented as an augmentation (addition) to the rendezvous protocol. In some embodiments, the data transfer operations (e.g., chunk get operations) may be offloaded to hardware (H/W). That is, the data transfer operations may be implemented using H/W components such as an application-specific integrated circuit (ASIC), a Field-Programmable Gate Array (FPGA), or any other circuitry configured to interpret and/or to execute program instructions and/or to process data. One technical advantage of a H/W implementation of the data transfer operations is that software intervention (e.g., in the form of additional processing threads) is not required to initiate the data transfer operations.

Turning now to the figures, FIG. 1 illustrates an example operating environment 100 in which some embodiments of a throttling transfer protocol may operate, in accordance with at least some embodiments described herein. As discussed above, the techniques, including the various embodiments of the protocol, as described herein may be suited to throttle bandwidth imbalance data transfers in an HPC system. Notwithstanding, those skilled in the art will appreciate that the technology described in the present disclosure is broadly applicable to other communication models (e.g., other systems, protocols and/or operations than those specifically described herein). Moreover, those skilled in the art will appreciate that the embodiments of the technology as described in the present disclosure are broadly applicable to bandwidth imbalanced data transfers.

In the context of a HPC system, environment 100 may include multiple compute nodes 102a-102p, each connected to a network fabric 104. Compute nodes 102a-102p may be collectively referred to herein as compute nodes 102, or singularly referred to herein as a compute node 102. In the illustrated example, compute nodes 102a-102p are shown. However, the number of compute nodes 102 depicted in environment 100 is merely for illustration, and one skilled in the art will appreciate that there may be a different number of compute nodes. For example, there may be a smaller number of compute nodes, or many thousands of compute nodes, for example, in the case of a super computer. Network fabric 104 allows the connected compute nodes 102 to communicate at very high speeds and low latency. Network fabric 104 may include any suitable high-speed network architecture such as Intel® OmniPath architecture, Infini-Band, Ethernet, LAN, WAN (e.g., iWARP over a WAN), and the like. As such, network fabric 104 may include one or more switches and/or routers.

Each compute node 102 may be embodied as any type of computing device or computing system capable of communication and that has sufficient processor power and memory capacity to perform the operations described in the present disclosure. For example, compute node 102 may be a rackmount server, blade server, standalone server, workstation, desktop computer, laptop, handheld computer, tablet computer (e.g., the iPad™ tablet computer), mobile computing or communication device (e.g., the iPhone™ mobile communication device, the Android™ mobile communication device, and the like), set-top box, and game console, to name a few examples. In some embodiments, compute nodes 102 may be similar in that each compute node 102 includes the same hardware and operating system. In some embodiments, some of compute nodes 102 may include different hardware and/or operating systems than some of other compute nodes 102.

As depicted, compute node 102 may include a processor 106, a memory 108, a data storage 110, an HPC middleware layer 112, a node fabric interface layer 114, and a throttling transfer protocol 116. Processor 106, memory 108, data storage 110, HPC middleware layer 112, and node fabric interface layer 114 may be communicatively coupled to one or more of the other. One skilled in the art will appreciate that compute node 102 may include other or additional components that may not be explicitly illustrated or described herein, such as an input/output (I/O) subsystem, memory controller, and bus interface, to name a few.

Processor 106 may include any processing unit suitable for use in a HPC system, such as an Intel® PentiumD processor, an Intel® Xeon® processor, or any other suitable multi core processor. In general, processor 106 may include any suitable special-purpose or general-purpose computer, computing entity, or computing or processing device including various computer hardware, or firmware, and may be configured to execute instructions, such as program instructions, stored on any applicable computer-readable storage media. For example, processor 106 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 1, processor 106 may include any number of processors and/or processor cores configured to, individually or collectively, perform or direct performance of any number of operations described in the present disclosure.

Memory 108 may include computer-readable storage media configured for carrying or having computer-executable instructions or data structures stored thereon. Such computer-readable storage media may include any available media that may be accessed by a general-purpose or special-purpose computer, such as processor 106. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Double Data Rate 2 (DDR2) RAM, 3-D stacked DRAM, Static Random Access Memory (SRAM), NVM, or any other suitable storage medium which may be used to carry or store particular program code in the form of computer-executable instructions or data structures and which may be accessed by a general-purpose or special-purpose computer. Combinations of the above may also be included within the scope of computer-readable storage media.

Data storage 110 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), NVM, or any other storage medium, including those provided above in conjunction with memory 108, which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause processor 106 to perform a certain operation or group of operations. In some embodiments, processor 106 may be configured to interpret and/or execute program instructions and/or process data stored in memory 108, data storage 110, or memory 108 and data storage 110. In some embodiments, processor 106 may fetch program instructions from data storage 110 and load the program instructions in memory 108. After the program instructions are loaded into memory 108, processor 106 may execute the program instructions.

For example, in some embodiments, any one or more of the components and/or modules of compute node 102 may be included in data storage 110 as program instructions. Processor 106 may fetch some or all of the program instructions from data storage 110 and may load the fetched program instructions in memory 108. Subsequent to loading the program instructions into memory 108, processor 106 may execute the program instructions such that the compute node 102 may implement the operations as directed by the instructions, including throttling transfer protocol 116 as described herein.

HPC middleware layer 112 is configured to facilitate message passing, including the exchange of data, between parallel processes (e.g., compute nodes executing an instance of an application program). For example, HPC middleware layer 112 may expose an Application Program Interface (API) to provide the application programs the message passing functionality for parallel programming. Examples of suitable message passing APIs include Message Passing Interface (MPI), Symmetric Hierarchical Memory Access (SHMEM), OpenSHMEM, Unified Parallel C (UPC), BSD Sockets, rSockets, and Advanced Message Queueing Protocol (AMQP) message queues. In some embodiments, HPC middleware 112 may include a Message Passing Interface (MPI) library, which implements the MPI API, to provide the message passing functionality. The MPI library supports a rendezvous protocol for large message (large message payload) transfers.

Node fabric interface layer 114 is configured to communicatively couple compute node 102 to network fabric 104. Node fabric interface layer 114 facilitates communication over network fabric 104, including the transfer of messages (e.g., network packets, network flows, network traffic, etc.), from a source to a destination (e.g., sender compute node to a receiver compute node). In some embodiments, node fabric interface layer 114 may expose and include a Portals 4 API and implementation. Portals 4 is a low level API for high performance networking on high performance computing systems. The Portals 4 API defines the fundamental operations to support high performance implementations of MPI and other HPC middleware layers. Additionally, the Portals 4 API defines a networking layer with a rich set of primitives capable of hardware offload. Accordingly, in some embodiments, the Portals 4 API may be implemented using one or more hardware components (e.g., network interface cards, controller chips, chipsets, etc.) of node fabric interface layer 114. In other embodiments, node fabric interface layer 114 may expose and include the OpenFabrics Interfaces (OFI) libfabric API.

Throttling transfer protocol 116 is configured to provide a receiver-driven rendezvous protocol that transparently throttles bandwidth mismatched data transfers. Throttling transfer protocol 116 splits or breaks up the transfer of a message payload into chunks, and transfers each chunk individually using a corresponding number of chunk get operations. The transfer of each chunk may be scheduled by a receiver of the payload to avoid overwhelming the available memory bandwidth of the receiver. In some embodiments, throttling transfer protocol 116 may be implemented using the Portals 4 interface. In the Portals 4 implementation, throttling transfer protocol 116 utilizes remote direct memory access (RDMA) read operations (PtlGet in Portals 4) to perform the chunk get operations to transfer most of the message payload. This is in contrast to currently existing protocols that use a single RDMA read operation to transfer all of or the remaining payload. In some embodiments, throttling transfer protocol 116 utilizes a triggered operations feature of Portals 4 to implement the chunk get operations as triggered operations. A triggered operation takes at least two additional parameters: a counter handle and a threshold value. The triggered operation is executed once the attached counter reaches (or is greater than) the threshold value. When implemented as triggered operations, node fabric interface layer 114 and, in particular, the Portals 4 implementation provided by node fabric interface layer 114, automatically starts execution of the chunk get operations based on a triggering threshold for each of the chunk get operations. For example, the threshold may be set such that a subsequent (scheduled) chunk get operation is started upon a previous (executing) chunk get operation completing. In some embodiments, the triggered operations may be executed without involvement of the host CPU, and thereby provide asynchronous progress of computation and communication. For example, the triggered operations may be offloaded to H/W components.

Figure 2:
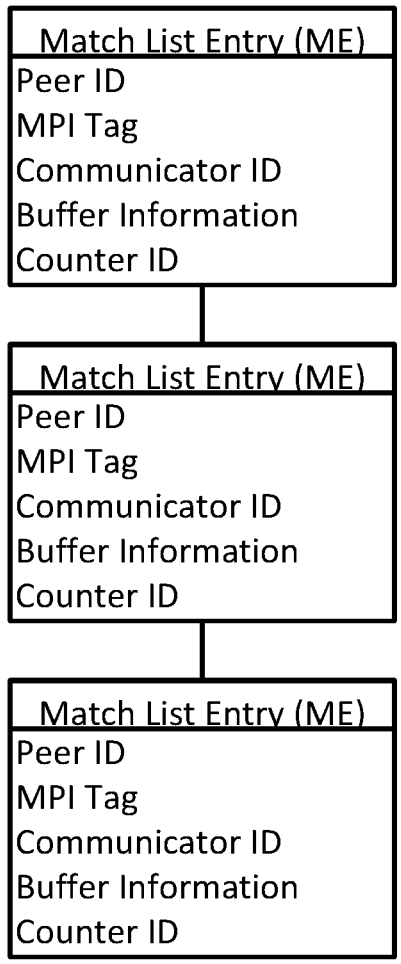
FIG. 2 illustrates selected contents of example match list entries (MEs) appended to a priority list and an overflow list, in accordance with at least some embodiments of the throttling transfer protocol described herein.
Figure 2:
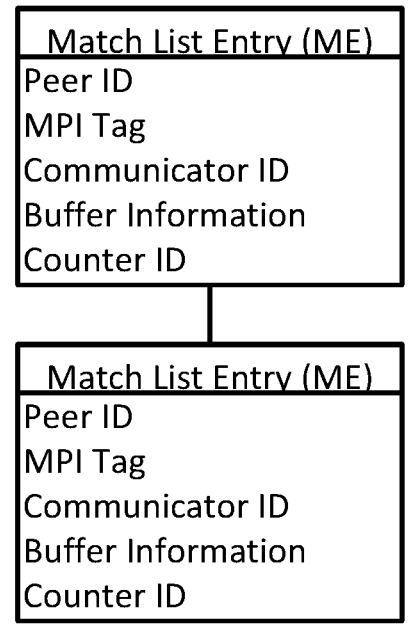

FIG. 2 illustrates selected contents of example match list entries (MEs) appended to a priority list and an overflow list, in accordance with at least some embodiments of the throttling transfer protocol described herein. MEs are used to expose memory regions for the RDMA put, get, and atomic operations supported by Portals 4. Three MEs are illustrated as being appended to the priority list, and two MEs are illustrated as being appended to the overflow list. The number of MEs appended to the priority list and the overflow list is for illustration, and one skilled in the art will appreciate that there may be a different number of MEs appended to the priority list and a different number of MEs appended to the overflow list. For example, the priority list may include a smaller number or a larger number of MEs than illustrated. Similarly, the overflow list may include a smaller number or a larger number of MEs than illustrated.

As illustrated, each ME includes a peer ID, an MPI tag, a communicator ID, and buffer information. The peer ID identifies a peer parallel process (peer MPI process) that is the source of the MPI message that corresponds to the ME. The MPI tag identifies the message (i.e., the MPI message that corresponds to the ME). The MPI tag is an integer that is chosen by the application layer. The communicator ID identifies a communication context or environment for the message. A message sent on a given communicator ID can only be received by receive operations performed on the same communicator ID. The communicator ID includes additional matching information. In some instances, the tag and communicator ID may be combined into a single 64-bit implementation-level tag value for matching. The buffer information specifies the location, size, and layout of the buffer from or to which data is transferred by the message. The ME may also include a counter ID that identifies an associated counter. The associated counter may be configured to count different types of events, such as successful transfers or transferred bytes. It will be appreciated that some of the information may not be included in an ME. For example, in some embodiments, one or more of the MEs may not include a counter. It will also be appreciated that information other than that described above may also be included in an ME. For example, in some embodiments, one or more of the MEs may include feature flags that modify its behavior (e.g., use-once or use-many times), protection information, or a mask that can cause certain pieces of matching information to be ignored.

A parallel process (an MPI process) may append a number of MEs to an overflow list to receive unexpected messages from peer parallel processes (peer MPI processes). Each ME appended to the overflow list may include wildcard values for the peer ID and the MPI tag, and specify a bounce buffer. Accordingly, the MEs appended to the overflow list may be used to match (receive) the unexpected messages, and copy the first chunk of payload included in the unexpected messages into the bounce buffers.

A receive operation for an expected message may be implemented by appending an ME for the expected message to a priority list. Before appending the ME to the priority list, a search of the messages received into the overflow list is conducted for a matching ME. If a matching message is not found in the overflow list, the ME for the expected message is appended to the priority list. To process an incoming message, the priority list is searched for a matching ME. If a matching ME is not found in the priority list, the incoming message is matched into an available ME in the overflow list as an unexpected message. The processing of expected messages and incoming messages by throttling transfer protocol 116 are further discussed below in conjunction with FIGS. 4-6.

Figure 3:
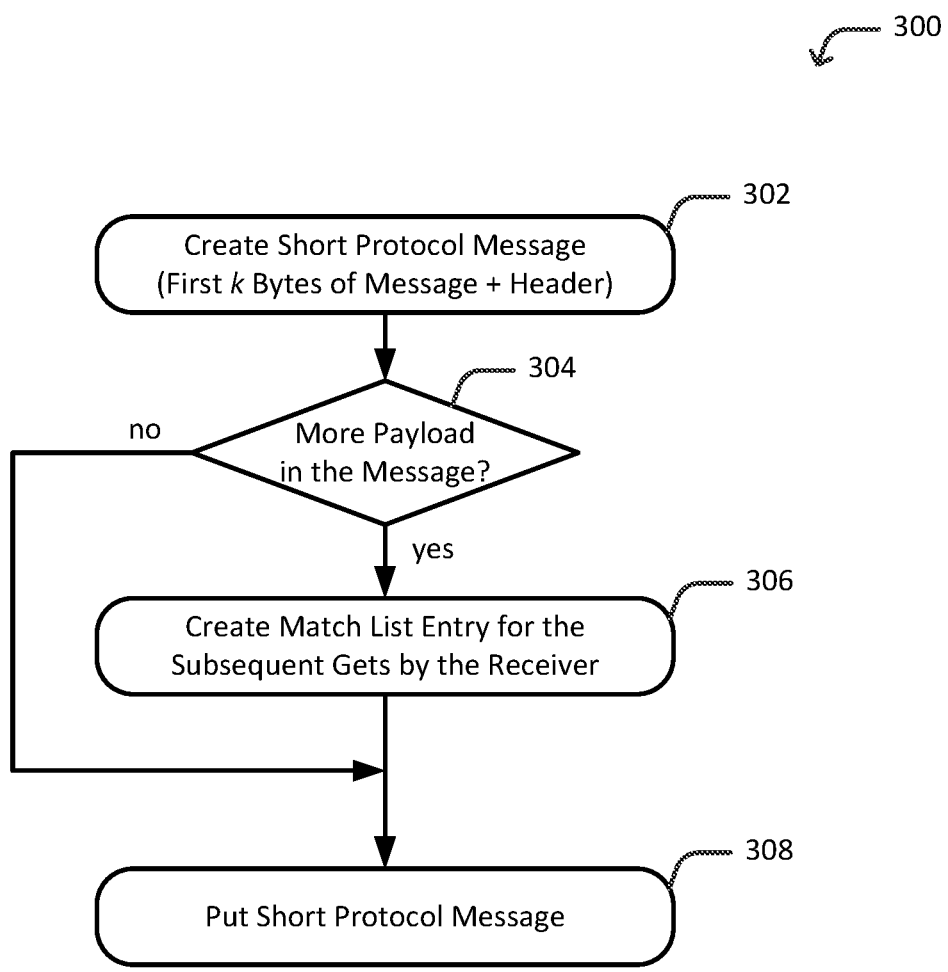
FIG. 3 is a flow diagram that illustrates an example method to process a send of a short protocol message, in accordance with at least some embodiments of the throttling transfer protocol described herein.
Figure 4:
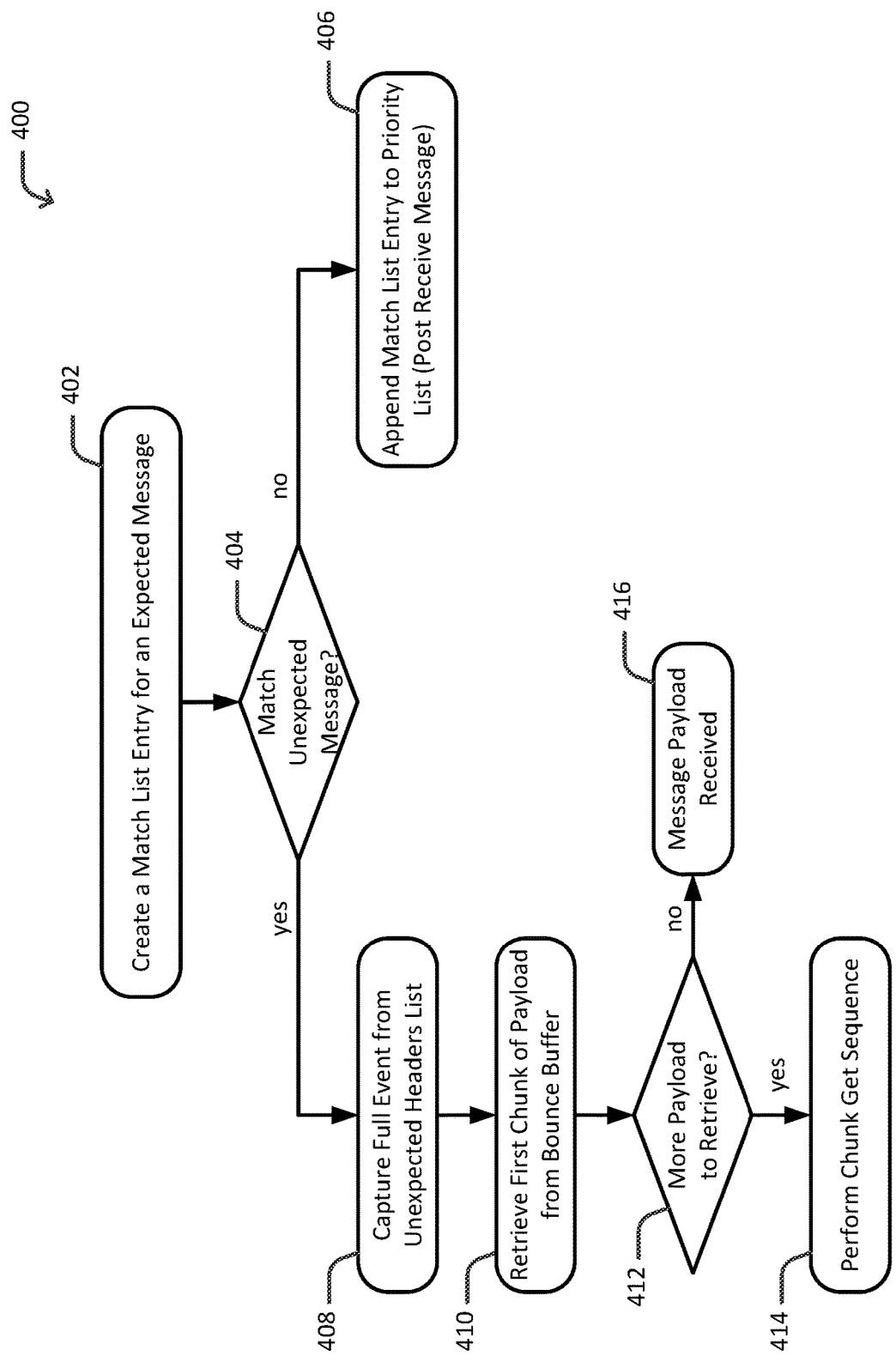
FIG. 4 is a flow diagram that illustrates an example method to process a receipt of message, in accordance with at least some embodiments of the throttling transfer protocol described herein.
Figure 5:
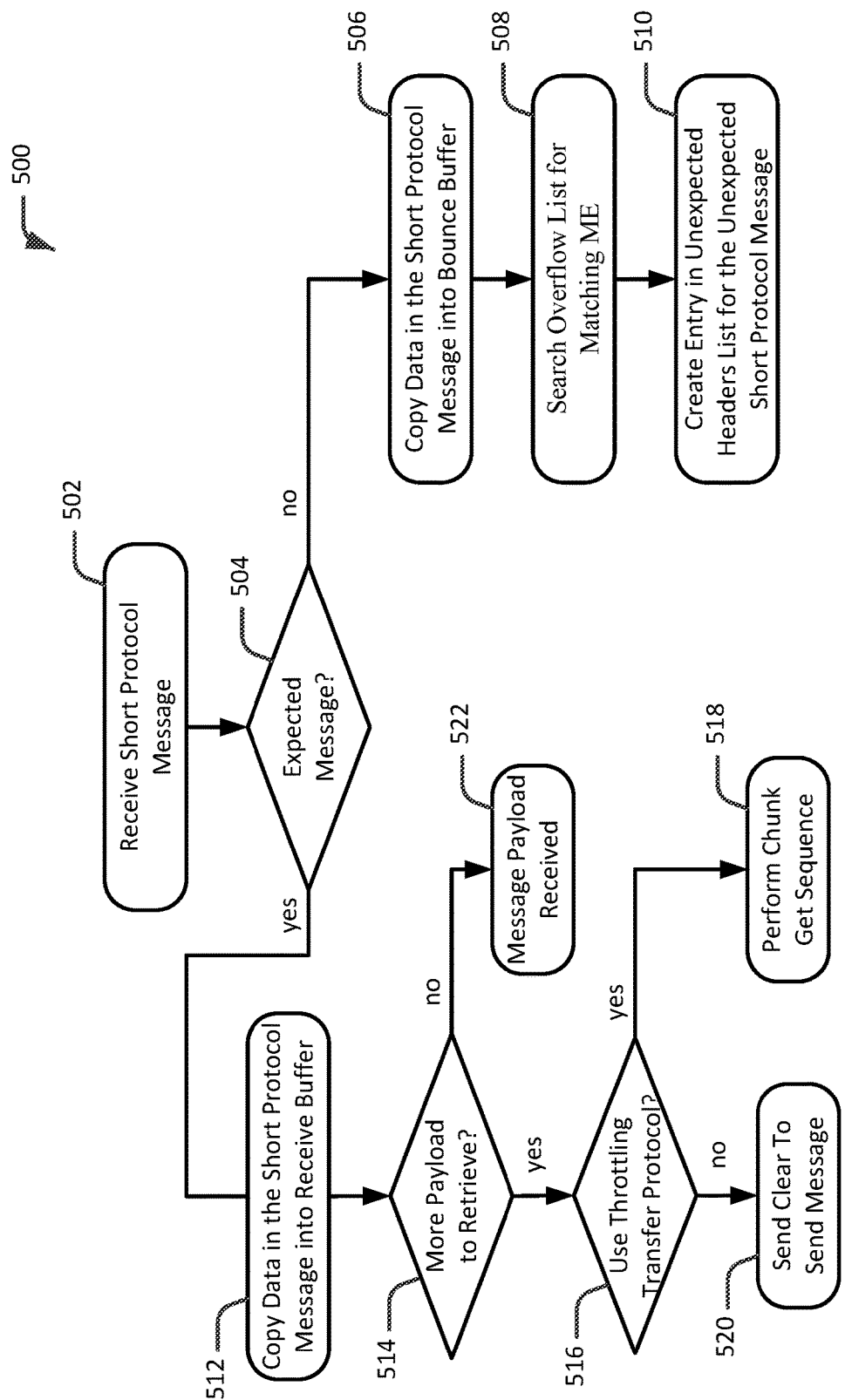
FIG. 5 is a flow diagram that illustrates an example method to process a receipt of a short protocol message, in accordance with at least some embodiments of the throttling transfer protocol described herein.
Figure 6:
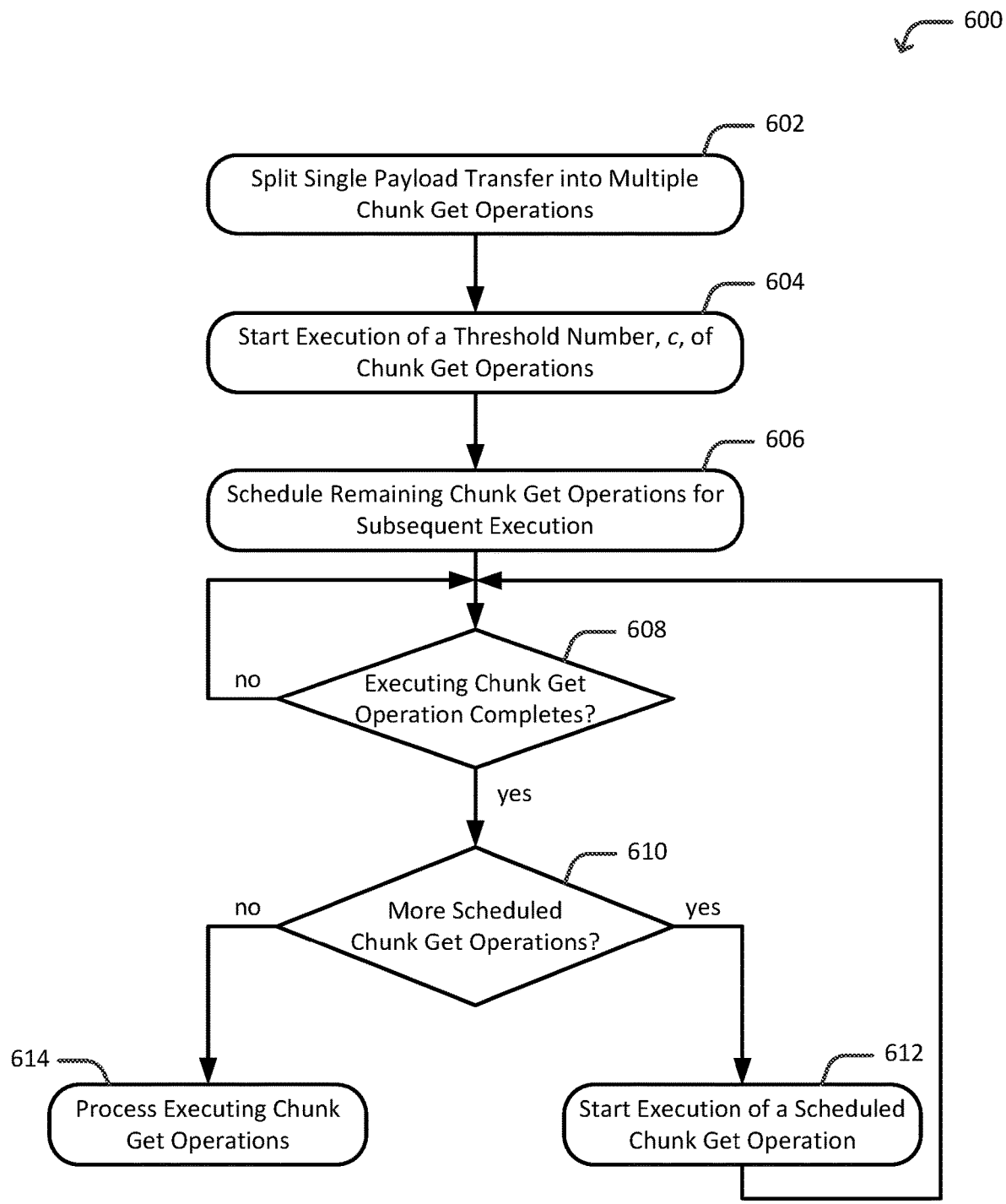
FIG. 6 is a flow diagram that illustrates an example method to process a chunk get sequence, in accordance with at least some embodiments of the throttling transfer protocol described herein.

FIG. 3 is a flow diagram that illustrates an example method 300 to process a send of a message, in accordance with at least some embodiments of the throttling transfer protocol described herein. FIG. 4 is a flow diagram that illustrates an example method 400 to process a receipt of a message, in accordance with at least some embodiments of the throttling transfer protocol described herein. FIG. 5 is a flow diagram that illustrates an example method 500 to process a receipt of a short protocol message, in accordance with at least some embodiments of the throttling transfer protocol described herein. FIG. 6 is a flow diagram that illustrates an example method 600 to process a chunk get sequence, in accordance with at least some embodiments of the throttling transfer protocol described herein. The operations, functions, or actions illustrated by methods 300, 400, 500, and 600 may in some embodiments be performed by the HPC system and, more particularly, compute node 102 of FIG. 1. The operations, functions, or actions described in the respective blocks of methods 300, 400, 500, and 600 may also be stored as computer-executable instructions in a computer-readable medium, such as memory 108 and/or data storage 110 of compute node 102.

Those skilled in the art will appreciate that, for these and other processes and methods disclosed herein, the functions performed in the processes and methods may be implemented in differing order. Additionally or alternatively, two or more operations may be performed at the same time. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 3, method 300 may begin with block 302 where a sender (e.g., an MPI process running on a sender compute node) creates a short protocol message for a message to send to a receiver (e.g., a peer MPI process running on a receiver compute node). The sender specifies values for a tag and a communicator handle, which are included in the header of the short protocol message. The sender also specifies the location, size, and layout of the memory that contains the data to be sent. The sender includes the first k bytes of the message (first k bytes of the payload), up to the eager/rendezvous threshold, in the short protocol message. The eager/rendezvous threshold specifies the amount (size) of data that may be included in a short protocol message. In some embodiments, the short protocol message serves as a ready to send message for the message from the sender to the receiver.

In some embodiments, the sender may also specify in the header of the short protocol message a matching nonce, which uniquely distinguishes this send operation from other send operations issued by the sender. The nonce may be used to distinguish messages with identical matching criteria, allowing the message chunks to be retrieved in any order. When a nonce is not used, or when all nonce values have been assigned to pending operations, message chunks need to be retrieved in the order in which the short protocol messages were sent. A nonce value can be reserved, allowing the sender to indicate this condition to the receiver.

Block 302 may be followed by decision block 304 where the sender checks to determine whether there is more payload in the message (e.g., whether the message is a large message—transfer of a large amount of data). That is, the sender checks to determine whether there is additional data to send in addition to the k bytes (i.e., the first chunk) included in the short protocol message (whether the message payload is larger than the k bytes included in the short protocol message). If the sender determines that there is additional data (payload) to send, decision block 304 may be followed by block 306.

At block 306, the sender creates an ME for the subsequent get operations (e.g., get chunk operations) that will be performed by the receiver to retrieve the remaining data (remaining payload) of the message. The sender attaches (associates) a counter to the created ME, and configures the counter, for example, with an expected value, to count the total number of bytes transferred. When the receiver performs the subsequent get operations to retrieve the remaining data, the sender compares the counter value to the expected value, and once the counter value reaches the expected value, the sender may determine that the sending of the message has completed. In some embodiments, the counter may be configured to count the successful get operations that are necessary to retrieve the remaining data.

Block 306 may be followed by block 308 where the sender performs a put operation to send the short protocol message. In the instance where block 306 is followed by block 308, there is additional payload for the receiver to retrieve and, thus, the entire payload is not yet sent.

Otherwise, if, at decision block 304, the sender determines that there is no additional data to send (e.g., the message payload is the k bytes included in the short protocol message), decision block 304 may be followed by block 308 where the sender performs a put operation to send the short protocol message. In the instance where decision block 304 is followed by block 308, the entire payload of the message is included in the short protocol message and, thus, the entire payload is sent.

With reference to FIG. 4, method 400 may begin with block 402 where a receiver (e.g., an MPI process running on a receiver compute node) creates an ME for an expected message from a sender (e.g., a peer MPI process running on a sender compute node). The ME includes values for the source, tag, communicator handle, and other arguments regarding the expected message (e.g., location, size, and layout of the buffer to which data will be written). Before appending the ME to the priority list, the receiver checks to determine whether the sender attempted to send the message. That is, the receiver checks to determine whether the sender sent a short protocol message representing or associated with the expected message.

Block 402 may be followed by decision block 404 where the receiver checks to determine whether the ME created for the expected message matches a message that was received into the overflow list. That is, the receiver checks the overflow list to determine whether the ME created for the expected message matches an unexpected message (e.g., a short protocol message that was unexpectedly received by the receiver). If the receiver determines that the ME created for the expected message does not match any of the MEs in the overflow list, decision block 404 may be followed by block 406 where the receiver appends the ME to the priority list. The ME appended to the priority list is a "place holder" for the message (e.g., short protocol message) to be received by the receiver. In some embodiments, the receiver may check an unexpected headers list to determine whether there is a match for the ME created for the expected message (e.g., whether the ME created for the expected message matches an entry in the unexpected headers list). The unexpected headers list may include entries for the unexpected short protocol messages received by the receiver. In some embodiments, the receiver may determine whether the receive buffer (destination buffer) will result in slow egress from the network fabric. If the receive buffer will result in slow egress from the network fabric, for example, the receive buffer is NVM, the receiver may elect to utilize the throttling transfer protocol. In this instance, the receiver may set a flag in the ME to indicate that the throttling transfer protocol is to be used. Additionally or alternatively, the receiver may post an ME with a buffer size equal to that of a short protocol message payload (e.g., buffer size equal to the eager/rendezvous threshold). Otherwise, the receiver can elect to utilize the non-throttling transfer protocol (e.g., existing put-based protocol). For example, the non-throttling transfer protocol may be efficient in instances where data is to be written into fast memory.

Otherwise, if, at decision block 404, the receiver determines that the ME created for the expected message does match an ME in the overflow list (or, in some embodiments, the unexpected headers list), decision block 404 may be followed by block 408 where the receiver captures a full event (e.g., receiving of a message). The event indicates the match bits (e.g., MPI tag, communicator handle, and nonce), message size (e.g., payload size), and the amount of the eager data chunk (e.g., the first k bytes of the payload included in the short protocol message that was actually stored in a bounce buffer).

Block 408 may be followed by block 410 where the receiver copies the first chunk of the message (the eager data chunk) from the bounce buffer into the receive buffer. In some embodiments, the receive buffer may be memory locations in the NVM of the receiver compute node.

Block 410 may be followed by decision block 412 where the receiver checks to determine whether there is additional data to retrieve (whether there is additional payload in addition to the data that was copied from the bounce buffer). If the receiver determines that there is additional data to retrieve, decision block 412 may be followed by block 414 where the receiver performs a chunk get sequence (the throttling transfer protocol) to retrieve the additional data. In some embodiments, the receiver may retrieve the additional data with a single get. This is potentially more efficient for the case where the data written to fast memory.

Otherwise, if, at decision block 412, the receiver determines that there is no additional data to retrieve, decision block 412 may be followed by block 416 where the receiver determines that the message payload is received. That is, the entire payload was included in the short protocol message.

The receiver may iterate method 400 to create and post MEs for other messages, from the same MPI process or a different MPI process, to be received by the receiver.

With reference to FIG. 5, method 500 may begin with block 502 where a receiver receives a short protocol message. Block 502 may be followed by decision block 504 where the receiver checks to determine whether the received short protocol message is an expected message. If the receiver determines that the received short protocol message is not an expected message, decision block 504 may be followed by block 506 where the receiver copies the data (e.g., k bytes of the payload) included in the received short protocol message into a bounce buffer. The data included in the short protocol message is the eager data chunk of the message payload.

Block 506 may be followed by block 508 where the receiver searches the overflow list for a matching ME. In some embodiments, the receiver (MPI process) appends a number of MEs configured to match unexpected messages received by the receiver to an overflow list. The receiver can then match the received unexpected short protocol message into one of the MEs in the overflow list.

Block 508 may be followed by block 510 where the receiver may create an entry in the unexpected headers list for the received unexpected short protocol message. The entry includes information regarding the received unexpected short protocol message, such as the match bits, the message size, and the amount of the k bytes of data included in the short protocol message that was actually stored in the bounce buffer. In some embodiments, the receiver may send to the sender a message to indicate that the receiver is not ready for the message (e.g., that the message payload has been "truncated"), and that the receiver will retrieve the remaining data (remaining payload). The message may serve as an indication to the sender that the receiver will utilize the throttling transfer protocol to retrieve the remaining data, and that the sender is to wait for the receiver to perform the get operations. In some embodiments, having created an entry in the unexpected headers list for the unexpected short protocol message, the receiver may remove the entry for the unexpected short protocol message in the overflow list. For example, the receiver may unlink the ME from the overflow list.

Otherwise, if, at decision block 504, the receiver determines that the received short protocol message is an expected message, decision block 504 may be followed by block 512 where the receiver copies the data (e.g., k bytes of the payload) included in the received short protocol message into the receive buffer. In some embodiments, the receive buffer may be memory locations in the NVM of the receiver compute node.

Block 512 may be followed by decision block 514 where the receiver checks to determine whether there is additional data to retrieve (e.g., whether there is additional payload in addition to the data that was copied from the bounce buffer). If the receiver determines that there is additional data to retrieve, decision block 514 may be followed by decision block 516 where the receiver checks to determine whether the throttling transfer protocol is to be used to retrieve the additional payload. For example, a decision may have previously been made, for example, at the time of posting the ME in the priority list, to use the throttling transfer protocol. If the receiver determines that the throttling transfer protocol is to be used, decision block 516 may be followed by block 518 where the receiver performs a chunk get sequence (the throttling transfer protocol) to retrieve the additional data. Otherwise, if the receiver determines that the throttling transfer protocol is not to be used, decision block 516 may be followed by block 520 where the receiver sends a clear to send message to the sender. In response to receiving the clear to send message, the sender pushes (e.g., the non-throttling transfer protocol) the remaining payload to the receiver.

Otherwise, if, at decision block 514, the receiver determines that there is no additional data to retrieve, decision block 514 may be followed by block 522 where the receiver determines that the message payload is received. That is, the entire payload was included in the short protocol message.

With reference to FIG. 6, method 600 may begin with block 602 where a receiver splits a single payload transfer operation into multiple chunk get operations. For example, the single payload transfer operation may be the remaining payload associated with a short protocol message received by the receiver (e.g., the payload in excess of the k bytes included in the short protocol message). Each chunk get operation may be an RDMA get operation to retrieve a respective chunk of the remaining payload of the message yet to be transferred from the sender to the receiver. In some embodiments, the receiver may determine the number of chunks to create (e.g., the size of each chunk) for the remaining payload based on the write bandwidth of the NVM into which the retrieved remaining payload will be written and/or the capabilities of the network fabric over which the remaining payload will be retrieved.

Block 602 may be followed by block 604 where the receiver starts execution of a threshold number, c, of chunk get operations. That is, the receiver starts executing c RDMA gets to retrieve c chunks of the remaining payload of the message. In some embodiments, the receiver may determine the threshold number, c, based on the size of each chunk, the write bandwidth of the NVM into which the retrieved remaining payload will be written, and/or the capabilities of the network fabric over which the remaining payload will be retrieved.

Block 604 may be followed by block 606 where the receiver schedules the remaining chunk get operations for subsequent execution. That is, the receiver schedules the remaining number of RDMA gets in excess of the c RDMA gets that were started and are executing for subsequent execution. In some embodiments, the receiver schedules the remaining chunk get operations such that no more than c chunk get operations are outstanding (executing) at any point in time.

In some embodiments, the receiver may perform the chunk get sequence (e.g., execution of the chunk get operations) as triggered operations. For example, the receiver may utilize the triggered operations feature of Portals 4 to implement the scheduling and subsequent issuance (start) of the chunk get operations. In some embodiments, the triggered operations may be attached to a counter, and be issued (started) when the counter reaches respective threshold values set for each of the triggered operations.

By way of example, suppose that there are six chunk get operations, that the value of c is determined to be 1, that a counter is configured to count the number of completed chunk get operations, and that one scheduled chunk get operation is to be triggered upon the completion of an executing (outstanding) chunk get operation to ensure that no more than c chunk get operations are outstanding. In this instance, the receiver may specify the counter thresholds for the four chunk get operations as follows:

Threshold 0: chunk get operation is issued
Threshold 1: chunk get operation is issued
Threshold 2: chunk get operation is issued
Threshold 3: chunk get operation is issued
Threshold 4: chunk get operation is issued
Threshold 5: chunk get operation is issued The chunk get operation triggered to start executing at counter threshold value 0 (e.g., zero completed chunk get operations) is the initial chunk get operation that starts executing as part of the initial c chunk get operations. When the counter reaches a threshold value of 1 (i.e., one executing chunk get operation completes), the chunk get operation triggered to start executing at counter threshold value 1 starts executing. Similarly, when the counter reaches a threshold value of 2 (i.e., another executing chunk get operation completes), the chunk get operation triggered to start executing at counter threshold value 2 starts executing. The fourth, fifth, and sixth scheduled chunk get operations are triggered and start executing in a similar manner as the second and third chunk get operations.

As another example, suppose c is determined to be 3 in the example above. In this instance, the receiver may specify the counter thresholds for the six chunk get operations as follows:

Threshold 0: chunk get operation is issued
Threshold 0: chunk get operation is issued
Threshold 0: chunk get operation is issued
Threshold 1: chunk get operation is issued
Threshold 2: chunk get operation is issued
Threshold 3: chunk get operation is issued The chunk get operations triggered to start executing at counter threshold value 0 (e.g., zero completed chunk get operations) are the initial chunk get operations that start executing as part of the initial c chunk get operations. In this case, the first three chunk get operations start executing as part of the initial c chunk get operations. When the counter reaches a threshold value of 1 (i.e., one of the three executing chunk get operations complete), the chunk get operation triggered to start executing at counter threshold value 1 starts executing. Similarly, when the counter reaches a threshold value of 2 (i.e., another of the three executing chunk get operations complete), the chunk get operation triggered to start executing at counter threshold value 2 starts executing. When the counter reaches a threshold value of 3 (i.e., another of the three executing chunk get operations complete), the chunk get operation triggered to start executing at counter threshold value 3 starts executing.

Block 606 may be followed by decision block 608 where the receiver checks to determine whether an executing (outstanding) chunk get operation completes. The receiver may check to determine whether a data chunk being retrieved by the outstanding chunk get operation is written into the receive buffer (e.g., NVM). For example, it may be determined that an executing chunk get operation completes when the chunk of data (data chunk) that is being retrieved by the chunk get operation is written into the receive buffer (e.g., NVM). If the receiver determines that an executing chunk get operation completes, decision block 608 may be followed by decision block 610. Otherwise, if the receiver determines that none of the executing chunk get operations have completed, the receiver may continue to check (e.g., poll) the executing chunk get operations for completion (continue at decision block 608).

At decision block 610, the receiver may check to determine whether there are more scheduled chunk get operations that need to execute (whether there are any more scheduled chunk get operations to issue). If the receiver determines that there are more scheduled chunk get operations, decision block 610 may be followed by block 612 where the receiver starts execution of a scheduled chunk get operation. In some embodiments, the receiver may start execution of the scheduled chunk get operations in sequence (e.g., a predetermined order). Block 612 may be followed by decision block 608 where the receiver checks to determine whether an executing (outstanding) chunk get operation completes.

Otherwise, if, at decision block 610, the receiver determines that there are no more scheduled chunk get operations, decision block 610 may be followed by block 614 where the receiver processes the executing (outstanding) chunk get operations. In this instance, execution of all of the scheduled chunk get operations has been started, and the chunk get operations that are still executing need to complete.

As indicated above, the embodiments described in the present disclosure may include the use of a special purpose or a general purpose computer (e.g., processor 106 of FIG. 1) including various computer hardware or software modules, as discussed in greater detail herein. Further, as indicated above, embodiments described in the present disclosure may be implemented using computer-readable media (e.g., memory 108 of FIG. 1) for carrying or having computer-executable instructions or data structures stored thereon.

EXAMPLE EMBODIMENTS

The following examples pertain to further embodiments, from which numerous permutations and configurations will be apparent.

Example 1 is a system to throttle bandwidth imbalanced data transfers. The system includes one or more non-transitory machine readable mediums configured to store instructions, and one or more processors configured to execute the instructions stored on the one or more non-transitory machine readable mediums. The instructions being configured to cause the one or more processors to: split a payload data transfer operation over a network fabric into a plurality of chunk get operations; execute a threshold number, c, of chunk get operations from the plurality of chunk get operations; schedule remaining chunk get operations from the plurality of chunk get operations as scheduled chunk get operations for subsequent execution; and in response to a determination of a completion of an executing chunk get operation and a determination of at least one scheduled chunk get operation, execute a chunk get operation from the scheduled chunk get operations.

Example 2 includes the subject matter of Example 1, wherein the chunk get operation includes a remote memory get operation to transfer a chunk of a payload.

Example 3 includes the subject matter of Examples 1 and 2, wherein the payload data transfer operation is over a high performance network fabric.

Example 4 includes the subject matter of any of Examples 1 through 3, wherein the payload data transfer operation includes a write operation to a non-volatile memory.

Example 5 includes the subject matter of any of Examples 1 through 4, wherein the payload data transfer operation is conducted in a high performance computing system.

Example 6 includes the subject matter of any of Examples 1 through 5, wherein to split the payload data transfer operation is based on capability of the network fabric.

Example 7 includes the subject matter of any of Examples 1 through 6, wherein the threshold number, c, is based on capability of the network fabric.

Example 8 includes the subject matter of any of Examples 1 through 7, wherein the chunk get operations are triggered operations.

Example 9 includes the subject matter of Example 8, wherein the triggered operations are based on a counter.

Example 10 includes the subject matter of any of Examples 8 and 9, wherein the triggered operations include a hardware implementation.

Example 11 includes the subject matter of any of Examples 1 through 10, wherein the scheduled chunk get operations are executed in sequence.

Example 12 is a computer-implemented method to throttle bandwidth imbalanced data transfers. The method includes splitting a payload data transfer operation over a network fabric into a plurality of chunk get operations; executing a threshold number, c, of chunk get operations from the plurality of chunk get operations; scheduling remaining chunk get operations from the plurality of chunk get operations as scheduled chunk get operations for subsequent execution; and in response to a determination of a completion of an executing chunk get operation and a determination of at least one scheduled chunk get operation, executing a chunk get operation from the scheduled chunk get operations.

Example 13 includes the subject matter of Example 12, wherein the chunk get operation includes a remote memory get operation to transfer a chunk of a payload.

Example 14 includes the subject matter of Examples 12 and 13, wherein the payload data transfer operation is over a high performance network fabric.

Example 15 includes the subject matter of any of Examples 12 through 14, wherein the payload data transfer operation includes a write operation to a non-volatile memory.

Example 16 includes the subject matter of any of Examples 12 through 15, wherein the payload data transfer operation is conducted in a high performance computing system.

Example 17 includes the subject matter of any of Examples 12 through 16, wherein the splitting the payload data transfer operation is based on capability of the network fabric.

Example 18 includes the subject matter of any of Examples 12 through 17, wherein the threshold number, c, is based on capability of the network fabric.

Example 19 includes the subject matter of any of Examples 12 through 18, wherein the chunk get operations are triggered operations.

Example 20 includes the subject matter of Example 19, wherein the triggered operations are based on a counter.

Example 21 includes the subject matter of any of Examples 19 and 20, wherein the triggered operations include a hardware implementation.

Example 22 includes the subject matter of any of Examples 12 through 21, wherein the scheduled chunk get operations are executed in sequence.

Example 23 is a computer program product including one or more non-transitory machine readable mediums encoded with instructions that when executed by one or more processors cause a process to be carried out to throttle bandwidth imbalanced data transfers. The process includes splitting a payload data transfer operation over a network fabric into a plurality of chunk get operations; issuing a threshold number, c, of chunk get operations from the plurality of chunk get operations; scheduling remaining chunk get operations from the plurality of chunk get operations as scheduled chunk get operations for subsequent execution; and in response to a determination of a completion of an executing chunk get operation and a determination of at least one scheduled chunk get operation, issuing a chunk get operation from the scheduled chunk get operations.

Example 24 includes the subject matter of Example 23, wherein the chunk get operation includes a remote memory get operation to transfer a chunk of a payload.

Example 25 includes the subject matter of Example 23 and 24, wherein the payload data transfer operation is over a high performance network fabric.

Example 26 includes the subject matter of any of Examples 23 through 25, wherein the payload data transfer operation includes a write operation to a non-volatile memory.

Example 27 includes the subject matter of any of Examples 23 through 26, wherein the payload data transfer operation includes a transfer operation in a high performance computing system.

Example 28 includes the subject matter of any of Examples 23 through 27, wherein the splitting the payload data transfer operation is based on capability of the network fabric.

Example 29 includes the subject matter of any of Examples 23 through 28, wherein the threshold number, c, is based on capability of the network fabric.

Example 30 includes the subject matter of any of Examples 23 through 29, wherein the chunk get operations are triggered operations.

Example 31 includes the subject matter of Example 30, wherein the triggered operations are based on a counter.

Example 32 includes the subject matter of any of Examples 30 and 31, wherein the triggered operations include a hardware implementation.

Example 33 includes the subject matter of any of Examples 23 through 32, wherein the scheduled chunk get operations are executed in sequence.

Example 34 is a system to throttle bandwidth imbalanced data transfers. The system includes means for splitting a payload data transfer operation over a network fabric into a plurality of chunk get operations; means for executing a threshold number, c, of chunk get operations from the plurality of chunk get operations; means for scheduling remaining chunk get operations from the plurality of chunk get operations as scheduled chunk get operations for subsequent execution; and means for, in response to a determination of a completion of an executing chunk get operation and a determination of at least one scheduled chunk get operation, executing a chunk get operation from the scheduled chunk get operations.

Example 35 includes the subject matter of Example 34, wherein the chunk get operation includes a remote memory get operation to transfer a chunk of a payload.

Example 36 includes the subject matter of Example 34 and 35, wherein the payload data transfer operation is over a high performance network fabric.

Example 37 includes the subject matter of any of Examples 34 through 36, wherein the payload data transfer operation includes a write operation to a non-volatile memory.

Example 38 includes the subject matter of any of Examples 34 through 37, wherein the payload data transfer operation is conducted in a high performance computing system.

Example 39 includes the subject matter of any of Examples 34 through 37, wherein the splitting the payload data transfer operation is based on capability of the network fabric.

Example 40 includes the subject matter of any of Examples 34 through 39, wherein the threshold number, c, is based on capability of the network fabric.

Example 41 includes the subject matter of any of Examples 34 through 40, wherein the chunk get operations are triggered operations.

Example 42 includes the subject matter of Example 41, wherein the triggered operations are based on a counter.

Example 43 includes the subject matter of any of Examples 41 and 42, wherein the triggered operations include a hardware implementation.

Example 44 includes the subject matter of any of Examples 34 through 43, wherein the scheduled chunk get operations are executed in sequence.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A system to throttle bandwidth imbalanced data transfers between a sender node and a receiver node coupled via a network fabric, the system comprising:
   one or more non-transitory machine readable mediums configured to store executable computer program instructions; and
   one or more processors configured to execute the computer program instructions stored on the one or more non-transitory machine readable mediums, execution of the computer program instructions being configured to cause the one or more processors to:
   choose a number of chunk get operations based on a write bandwidth of non-volatile memory of the receiver node, the write bandwidth of the non-volatile memory being less than a network bandwidth of the network fabric;
   split a payload data transfer operation over the network fabric into a plurality of chunk get operations, wherein a chunk get operation of the plurality of chunk get operations transfers a chunk of a payload over the network fabric via a remote direct memory access (RDMA) read operation executed by the receiver node;
   execute a threshold number, c, of chunk get operations from the plurality of chunk get operations;
   schedule remaining chunk get operations from the plurality of chunk get operations as scheduled chunk get operations for subsequent execution; and
   in response to a determination of a completion of an executing chunk get operation and a determination of at least one scheduled chunk get operation, execute a chunk get operation from the scheduled chunk get operations.

2. The system of claim 1, wherein the payload data transfer operation includes one or more of a transfer operation over the network fabric, a write operation to the non-volatile memory, and a transfer operation in a high performance computing system.

3. The system of claim 1, wherein to split the payload data transfer operation is based on a capability of the network fabric.

4. The system of claim 1, wherein the threshold number, c, is based on a capability of the network fabric.

5. The system of claim 1, wherein each chunk get operation of the plurality of chunk get operations is a triggered operation.

6. The system of claim 5, wherein the triggered operation includes a hardware implementation.

7. The system of claim 1, wherein the scheduled chunk get operations are executed in sequence.

8. A computer-implemented method to throttle bandwidth imbalanced data transfers between a sender node and a receiver node coupled via a network fabric, the method comprising:
choosing a number of chunk get operations based on a write bandwidth of non-volatile memory of the receiver node, the write bandwidth of the non-volatile memory being less than a network bandwidth of the network fabric;
splitting a payload data transfer operation over the network fabric into a plurality of chunk get operations, wherein a chunk get operation of the plurality of chunk get operations transfers a chunk of a payload over the network fabric via a remote direct memory access (RDMA) read operation executed by the receiver node;
executing a threshold number, c, of chunk get operations from the plurality of chunk get operations;
scheduling remaining chunk get operations from the plurality of chunk get operations as scheduled chunk get operations for subsequent execution; and
in response to a determination of a completion of an executing chunk get operation and a determination of at least one scheduled chunk get operation, executing a chunk get operation from the scheduled chunk get operations.

9. The method of claim 8, wherein the payload data transfer operation includes a write operation to the non-volatile memory.

10. The method of claim 8, wherein the payload data transfer operation is conducted in a high performance computing system.

11. The method of claim 8, wherein splitting the payload data transfer operation is based on a capability of the network fabric.

12. The method of claim 8, wherein the threshold number, c, is based on a capability of the network fabric.

13. The method of claim 8, wherein each chunk get operation of the plurality of chunk get operations is a triggered operation.

14. The method of claim 13, wherein the triggered operation is based on a counter.

15. The method of claim 13, wherein the triggered operation includes a hardware implementation.

16. A computer program product including one or more non-transitory machine readable mediums encoded with executable computer program instructions that when executed by one or more processors cause a process to be carried out to throttle bandwidth imbalanced data transfers between a sender node and a receiver node coupled via a network fabric, the process comprising:
choosing a number of chunk get operations based on a write bandwidth of non-volatile memory of the receiver node, the write bandwidth of the non-volatile memory being less than a network bandwidth of the network fabric;
splitting a payload data transfer operation over the network fabric into a plurality of chunk get operations, wherein a chunk get operation of the plurality of chunk get operations transfers a chunk of a payload over the network fabric via a remote direct memory access (RDMA) read operation executed by the receiver node;
executing a threshold number, c, of chunk get operations from the plurality of chunk get operations;
scheduling remaining chunk get operations from the plurality of chunk get operations as scheduled chunk get operations for subsequent execution; and
in response to a determination of a completion of an executing chunk get operation and a determination of at least one scheduled chunk get operation, executing a chunk get operation from the scheduled chunk get operations.

17. The computer program product of claim 16, wherein the payload data transfer operation includes one or more of a transfer operation over the network fabric, a write operation to the non-volatile memory, and a transfer operation in a high performance computing system.

18. The computer program product of claim 16, wherein the payload data transfer operation includes a write operation to a non-volatile memory.

19. The computer program product of claim 16, wherein splitting the payload data transfer operation is based on capability of the network fabric.

20. The computer program product of claim 16, wherein the threshold number, c, is based on capability of the network fabric.

* * * * *